United States Patent [19]
Madler et al.

[11] 3,917,306
[45] Nov. 4, 1975

[54] OFF-THE-ROAD VEHICLE

[76] Inventors: Herman J. Madler, 108 S. George St., Mount Prospect, Ill. 60056; Kenneth I. Doane, Sr., 2812 S. Cicero Ave., Cicero, Ill. 60650

[22] Filed: Feb. 7, 1974

[21] Appl. No.: 440,497

[52] U.S. Cl. ............ 280/104; 280/124 R; 280/106.5
[51] Int. Cl.² ......................................... B60G 19/02
[58] Field of Search ............. 280/104, 124 R, 106.5

[56] References Cited
UNITED STATES PATENTS

| | | | |
|---|---|---|---|
| 931,653 | 8/1909 | Rosenstengel | 280/104 |
| 1,439,802 | 12/1922 | DeMiranda | 280/104 |

*Primary Examiner*—Philip Goodman

[57] ABSTRACT

An off-the-road vehicle includes a vehicle body mounted on a frame. The frame includes a pair of elongated spaced-apart frame arms which are joined by a transverse central axle for independent rotation thereabout. The frame arms are joined adjacent their forward and rearward ends by connecting arms, each of which includes a center arm and a link pivotally connected to each end of the center arm and to one of the frame arms. The pivotal links permit the distance between the ends of the frame arms to increase as the frame arms rotate relative to each other while maintaining the middle of the center arms centered between the frame arms. Vehicle attaching means are secured to each of the center arms, and the vehicle body is secured to the attaching means. At least one wheel is carried by each of the forward and rearward ends of each of the frame arms.

8 Claims, 14 Drawing Figures

OFF-THE-ROAD VEHICLE

BACKGROUND

This invention relates to an off-the-road vehicle, and more particularly, to a vehicle which is equipped with a frame having independently movable frame arms and attaching means for mounting the vehicle body which remain centered between the frame arms as the frame arms rotate relative to each other.

The invention is a modification of the vehicles described in our prior U.S. Pat. Nos. 3,506,079 and 3,525,534.

Many vehicles have been designed to operate off improved roadways or highways and on uneven or rough terrain. These vehicles are commonly called off-the-road vehicles or all-terrain vehicles. Some of these vehicles are of four wheel construction and others are of six or more wheeled construction. In the six-wheeled vehicle category, two basic vehicle designs have evolved. One is the one piece frame, single body type vehicle. The other is the split frame, split body type vehicle. Each type has inherent limitations which prevents it from providing good transportation over uneven or rough terrain.

The one piece frame, single body type vehicle has limited rough terrain utility because of the torsional stress which is transmitted between the frame and the attached body when the vehicle is operated over rough terrain. The limitations of the vehicle are especially noticeable when two or more pairs of wheels rest on uneven ground areas, and the torsional stress transmitted by the wheels to the vehicle frame is further transmitted to the body in a manner that tends to strain and damage the vehicle body.

In addition, the torsional stress reduces the amount of traction between a wheel or wheels of the vehicle and the ground by a twisting action which tends to lift a wheel partially or entirely off the ground, or, in the alternative, which prevents the wheel from dropping into full contact with the ground. These factors build into the vehicle a great amount of vibration, which in turn causes physical fatigue to the driver and passengers and potential damage to the cargo. Furthermore, the weight of the load being transported is not being equally carried by each wheel, resulting in additional body stress. To overcome some of the torsional stress problems, this type of vehicle usually has a heavy, strong frame to absorb the torsional stress transmitted to the frame when the wheels traverse uneven ground. Nevertheless, the torsional stress is not eliminated.

The split frame, split body vehicle is constructed to provide a forward and rear body section imposed upon a hinged or articulated vehicle frame. There is a tendency in this type of vehicle for the front and rear bodies to jackknife when the brakes or power are applied to the wheels of the body section and not another. In addition, because of the split body, the cargo or passenger carrying capacity of the vehicle is smaller than a single body vehicle of similar dimensions.

The vehicles described in our prior U.S. Pat. Nos. 3,506,079 and 3,525,534 include a one-piece vehicle body which is mounted on a frame having two or four longitudinally extending frame arms which are independently rotatable about transverse central axle. Extendible connecting arms permit the distance between the frame arms to vary as the frame arms rotate relative to each other about the center axle. The vehicle body is attached to the center of each connecting arm, and this attaching point is maintained centered between the frame arms by centering links.

SUMMARY

The vehicle formed in accordance with the invention utilizes connecting arms between the frame arms which include a center arm and links which are pivotally secured to each end of the center arm and pivotally secured to the adjacent frame arm. The links permit the distance between the frame arms to vary while maintaining the center of the center arms centered between the frame arms. The vehicle body is attached to a pair of mounting arms, each of which extends from the center axle to one of the center arms. Each mounting arm is independently pivotable about the center axle and is pivotally connected to the body about an axis extending parallel to the center axle, and the connecting means between one of the mounting arms and the body permit relative longitudinal movement between the body and the associated connecting arms.

DESCRIPTION OF THE DRAWINGS

The invention will be explained in conjunction with an illustrative embodiment shown in the accompanying drawing, in which.

DESCRIPTION OF SPECIFIC EMBODIMENT

Figure 1:
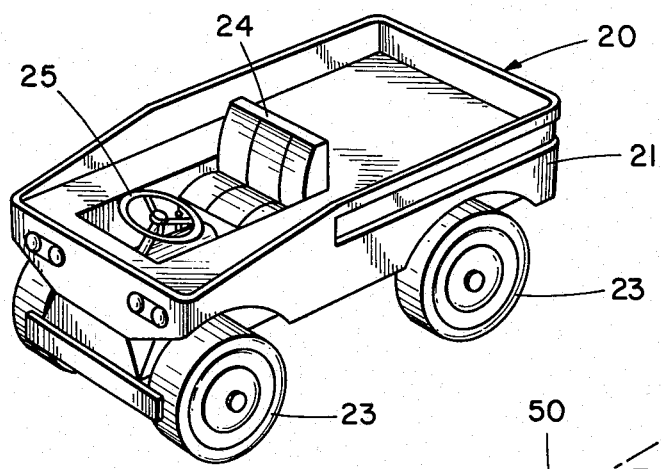
FIG. 1 is a perspective view of a vehicle constructed in accordance with the invention.
Figure 2:
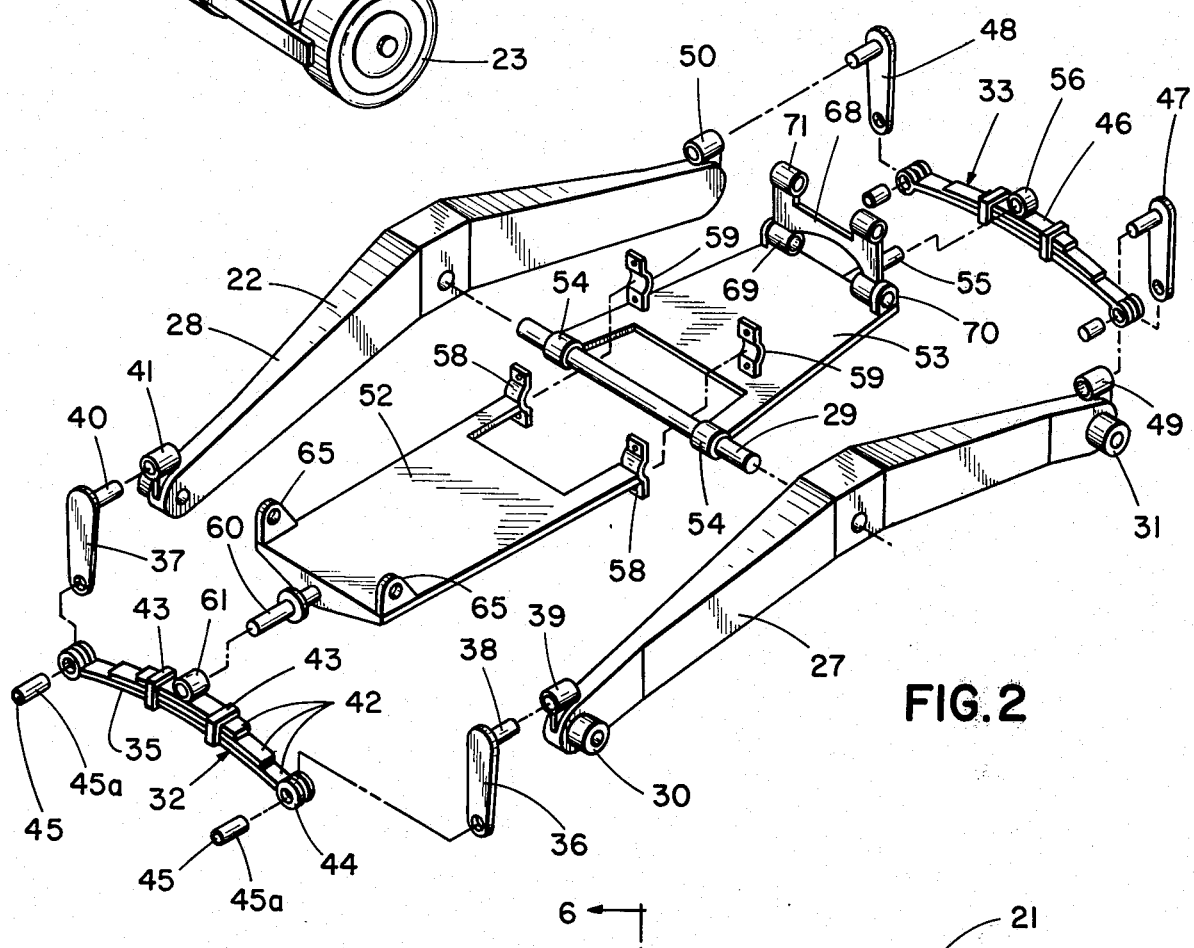
FIG. 2 is an exploded perspective view of the vehicle frame.

Referring first to FIG. 1, the numeral 20 designates generally a vehicle having a vehicle body 21 supported by a frame 22 (FIGS. 1 and 3) which carry wheels 23. The vehicle body includes the usual driver's seat 24 and steering wheel 25.

The frame 22 includes a pair of longitudinally extending frame arms 27 and 28, each of which is pivotally secured to center axle 29 which extends between the approximate mid-points of the frame arms. The frame arm 27 includes stub shaft housing 30 and 31 mounted on the forward and rearward ends thereof for supporting stub axles which carry front and rear wheels, respectively, and the other frame arm 28 is provided with similar axle housing for front and rear wheels which are carried by that frame arm.

Front and rear connecting arm assemblies 32 and 33 extend between the forward and rearward end of the frame arms, respectively, and each connecting arm assembly permits the distance between the ends of the frame arms to vary as the frame arms rotate relative to each other about the central axle. The connecting arm assembly 32 includes a center arm 35 and a pair of links 36 and 37, each of which is pivotally secured to one end of the center arm. The link 36 includes a pivot pin 38 which is rotatably received by a sleeve 39 mounted on the front end of the frame arm 27, and the link 37 includes a pin 40 which is rotatably received by a sleeve 41 mounted on the forward end of the frame arm 28. The particular center arm 35 illustrated comprises a leaf spring having a plurality of arcuate bands 42 which are held together by a pair of clamps 43 which permit some relative sliding movement between the bands as the bands straighten out under the weight of a load carried by a vehicle. Each end of the lowermost band is provided with a clevis 44, and each of the links 36 and 37 is pivotally secured to the clevis by a pivot pin 45 which is surrounded by a compressible rubber sleeve 45a.

The other connecting arm assembly 33 is identically formed and includes a center arm 46, the ends of which are pivotally secured to links 47 and 48, which are in turn pivotally secured to sleeves 49 and 50 which are mounted on the frame arms 27 and 28.

The length of the pins 38 and 40 which are received by the housings 39 and 41 is longer than the length of the housings, and suitable retention means, such as Cotter pins or the like, prevent the pins from being withdrawn from the housings. The pins can rotate freely within the housings, and, since the pins are longer than the housings, some longitudinal sliding movement of the pins relative to the housings is permitted. The pins of the links 47 and 48 are similarly longer than the housings 49 and 50, and some relative sliding movement between the pins and the housings is permitted.

Figure 3:
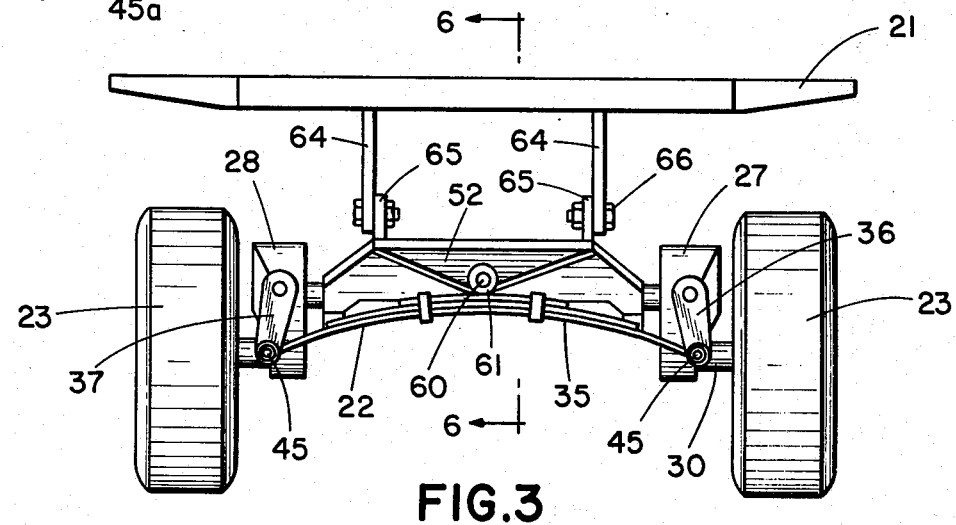
FIG. 3 is a front elevational view of the vehicle.

Referring to FIG. 3, when the vehicle is resting on even ground, the leaf spring connecting arms 35 and 46 extend arcuately between the frame arms 27 and 28, and the links 36, 37, 47 and 48, which pivotally connect the center arms to the frame arms extend downwardly and slightly outwardly.

A pair of mounting arms in the form of plates 52 and 53 extend between the center axle 29 and each of the connecting arm assemblies. The plate 53 is pivotally secured to the center axle by a pair of axially spaced bushings 54 and is secured to the connecting arm 46 by a pivot pin 55 which is rotatably received by a sleeve 56 welded to the top band of the leaf spring 46. Suitable retention means can be secured to the end of the pin 55 to permit axial movement of the pin relative to the sleeve but to prevent complete withdrawal of the pin.

The mounting plate 52 is rotatably secured to the center axle 29 by a pair of bushing halves 58 which are bolted to a pair of bushing halves 59. The mounting plate 52 is connected to the connecting arm assembly 32 by a pivot pin 60 which is rotatably received by a sleeve 61 welded to the center arm 35. Retention means can also be provided for the pivot pin 60.

Figure 6:
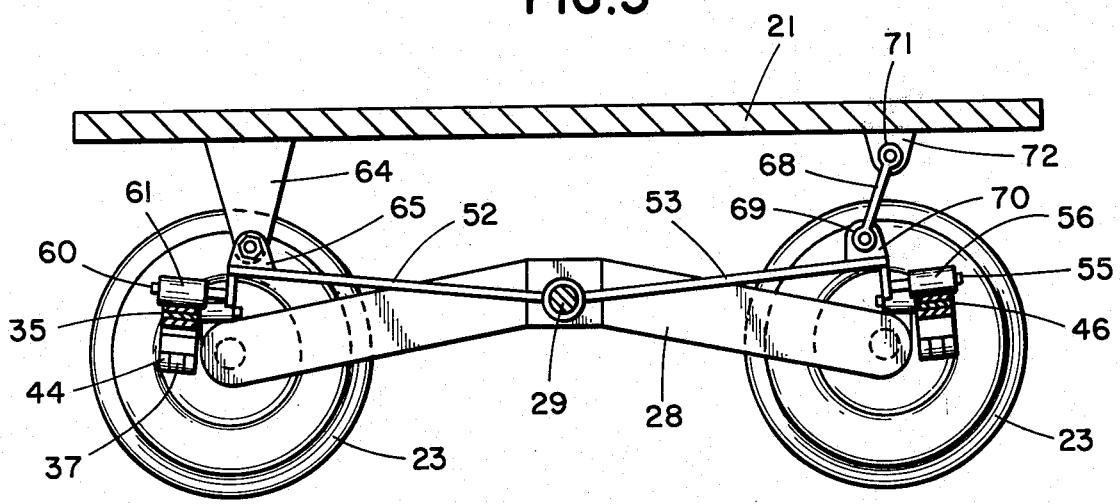
FIG. 6 is a sectional view taken along the line 6—6 of FIG. 3.

The forward end of the vehicle is connected to the frame by a pair of transversely spaced brackets 64 (FIG. 3) which extend downwardly from the body, and each bracket is pivotally secured to an upstanding lug 65 on the forward mounting arm 52 by a bolt 66. The rear end of the vehicle body is secured to the rear mounting arm 53 by a means of an attaching plate 68 (FIGS. 3 and 6). The lower end of the attaching plate includes a pair of sleeves 69 which are pivotally secured to upstanding lugs 70 on the mounting arm 53, and the upper end of the attaching plate 68 includes a pair of sleeves 71 which are pivotally secured to downwardly extending attaching lugs 72 on the vehicle body (FIG. 6).

When the vehicle body is not carrying any load other than its own weight and the vehicle is resting on even ground, the vehicle body is supported by the frame in the manner illustrated in FIGS. 3 and 6. The center axle 29 extends horizontally between the frame arms, and the leaf spring connecting arms 35 and 46 are bowed upwardly. Each of the mounting arms 52 and 53 are inclined upwardly, and the attaching plate 68 which mounts the rear of the vehicle body to the mounting arm 53 extends slightly rearwardly from the mounting arm.

Figure 4:
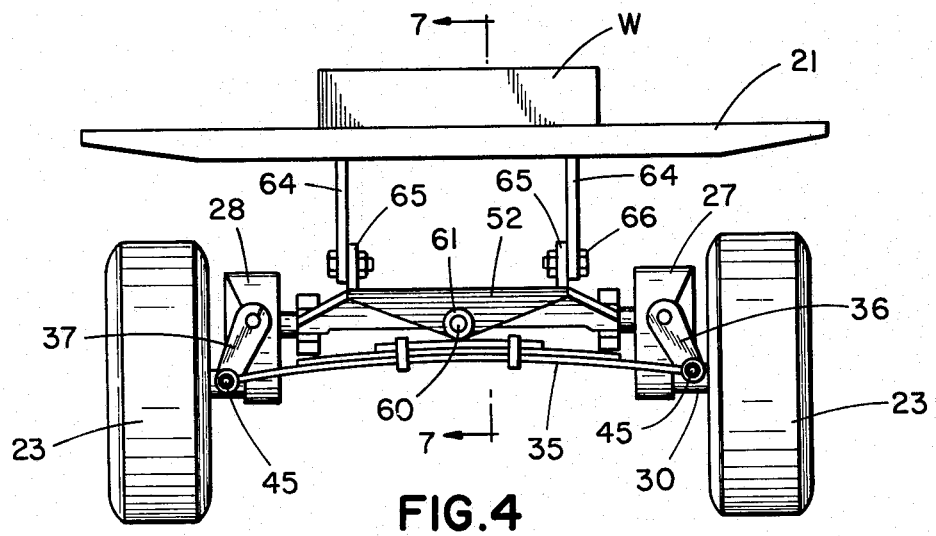
FIG. 4 is a view similar to FIG. 3 showing the vehicle supporting load.
Figure 7:
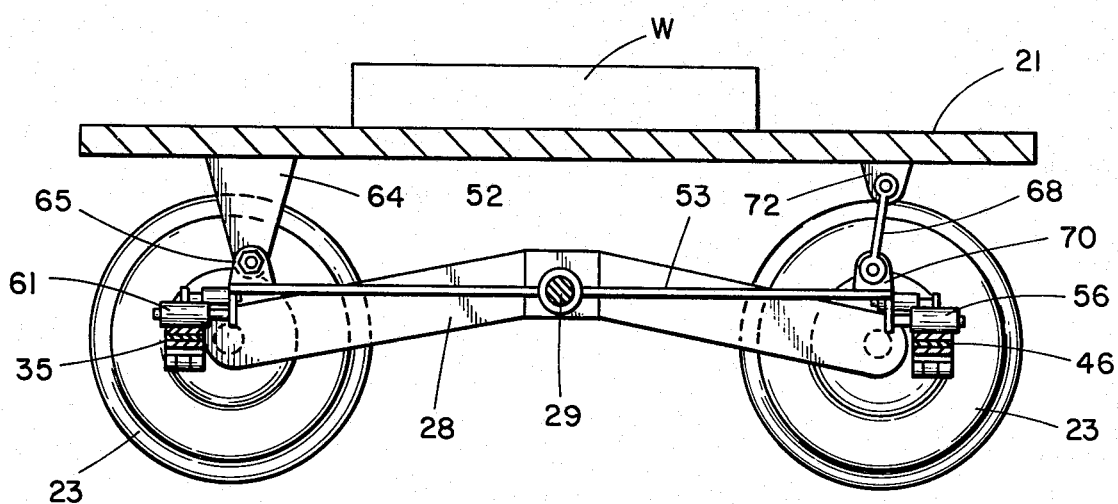
FIG. 7 is a sectional view taken along the line 7—7 of FIG. 4.

The leaf springs 35 and 46 are intended to cushion the vehicle body and the occupant riding therein from shocks which are encountered by the wheels. When the vehicle body carries a load (represented by the block "W" in FIGS. 4 and 7 and which may be the weight of the occupant of the vehicle), the weight of the load causes the leaf springs to flatten somewhat as illustrated in FIGS. 4 and 7. The links 36, 37, 47 and 48, which pivotally connect the leaf springs to the frame arms, pivot outwardly to permit the horizontal distance between the ends of the leaf springs to increase even though the spacing between the frame arms is maintained fixed by the center axle. As the leaf springs become flatter, the mounting arms 52 and 53 pivot downwardly about the center axle, and in FIG. 7 the mounting arms extend horizontally. Pivotal movement of the mounting arms 52 and 53 from the upwardly inclined position of FIG. 6 to the horizontal position of FIG. 7 increases the distance between the attaching lugs 65 and 70 carried thereby, and this increased distance is accommodated by swinging movement of the plate 68. The brackets 64 and lugs 72 which attach the vehicle body to the frame remain in fixed locations on the vehicle body.

Figure 5:
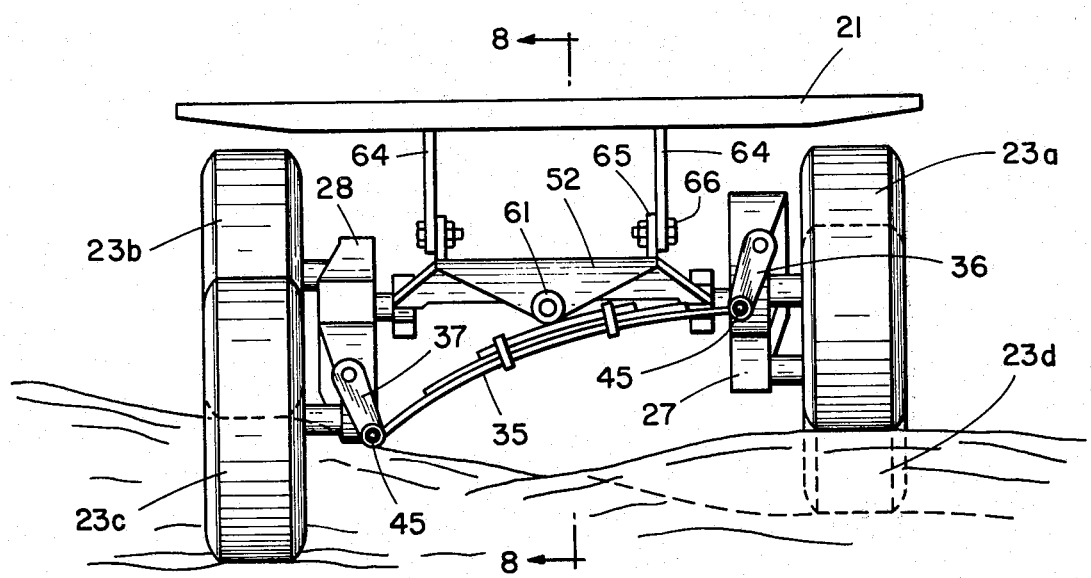
FIG. 5 is a front elevational view of the vehicle transversing uneven terrain.
Figure 8:
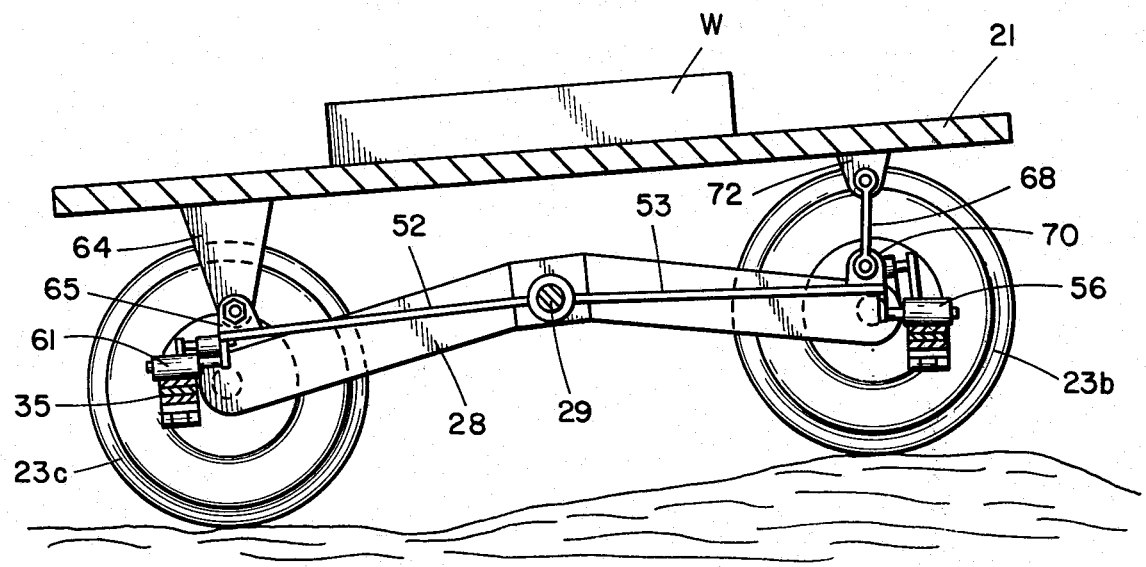
FIG. 8 is a sectional view taken along the line 8—8 of FIG. 5.

The links 36, 37, 47 and 48, which connect the center arms 35 and 46 to the frame arms, are formed of rigid metal. These links maintain the center of the center arms and the sleeves 56 and 61 carried thereby centered transversely between the frame arms. When any of the wheels encounter a bump, the frame arm which carries that wheel rotates about the center axle relative to the other frame arm to permit the wheel to ride up the bump. As the frame arms rotate relative to each other, the distance between the ends of the frame arms increases, and the increased distance is accommodated by inward pivoting of the links which connects the center arm to the frame arms. For example, FIGS. 5 and 8 illustrate the vehicle in a position in which the left front wheel 23a and right rear wheel 23b are on bumps, and the right front wheel 23c and the left rear wheel 23d are resting on lower ground. The forward end of the frame arm 27 which carries the left front wheel 23a has pivoted upwardly relative to the rear wheel, and the rear end of the frame arm 28 which carries the right rear wheel 23b pivots upwardly relative to the front wheel. The links 36 and 37 rotate inwardly to accommodate the increased distance between the front end of the frame arms and the center arm 35 is inclined upwardly from the frame arm 28 to the frame arm 27. The links 47 and 48 similarly rotate inwardly to accommodate the increased distance between the rear ends of the frame arms, and the center arm 46 is inclined upwardly from the frame arm 27 to the frame arm 28. The links maintain the sleeves 61 and 56 centered between the frame arms even though the center arms 35 and 46 are inclined, and the mounting arms 52 and 53 remain centered between the frame arms. The housings 56 and 61 are freely rotatable on the pins 55 and 60, respectively, and the center arms can rotate about these pins without transmitting torsional stress to the mounting arms.

If only one of the wheels is on a bump, the frame arm which carries that wheel will rotate to permit the wheel to ride freely over the bump. For example, if the left front wheel encounters a bump, the front end of the frame arm 27 will be lifted and will rotate relative to the frame arm 28. The distance between the front end of the frame arms will increase, and the links 36 and 37 will rotate inwardly to accommodate this increased distance. Since the rear wheels remain level, the axle will be tilted somewhat with respect to the horizontal, but the middle of the frame arm 27 will be raised only half the distance that the right front wheel is raised.

Since the front of the frame arm 27 is inclined relative to the frame arm and to the horizontal, the horizontal distance between the front of the frame arm 27 and the rear of the frame arms 27 and 28 is decreased. However, this decrease in the horizontal distance is accommodated by relative sliding movement of the housings 56 and 61 on the pins 55 and 60, respectively, and by swinging movement of the attaching plate 68 which is pivotally secured to both the vehicle body and the mounting arm 53.

As the front of the frame arm 27 is raised relative to the front of the frame arm 28, the connecting arm 35 tends to be twisted somewhat about a line extending between the front ends of the frame arms. This twisting movement is accommodated by the compressible rubber sleeves 45a which cover the pivot pins 45 which connect the center arm 35 to the links 36 and 37.

The point at which the vehicle body is secured to the mounting arm 52 remains fixed in the longitudinal direction as the frame arms move relative to each other, and steering linkage, controls, etc., can extend between the body and the frame adjacent this point. The vehicle may be powered by any conventional power means such as an internal combustion engine mounted on the mounting arm 52, and power can be transmitted to the wheels as described, for example, in our aforementioned patents.

If spring suspension provided by the leaf spring connecting arms 35 and 46 is not desired, rigid center arms can be used. In this case the mounting arms 52 and 53 can be made from one piece or rigid plate which is pivotally secured to the center axle.

Figure 9:
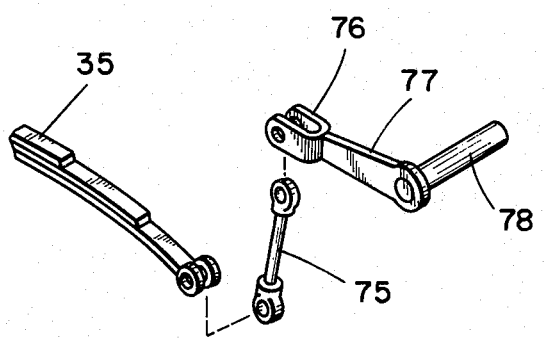
FIG. 9 is an exploded fragmentary perspective view of a modified linkage means for connecting the center arm of the frame to the frame arms.

FIG. 9 illustrates a modified form of linkage means for connecting the center arm 35 to the frame arms. The end of the center arm is pivotally connected to a link 75, and the other end of the link is pivotally connected to a clevis 76 carried by a torsion arm 77. A pivot pin 78 is secured to the torsion arm and extends through a sleeve similar to the sleeve 39 mounted on the frame arm 27. A coil spring can be ensleeved on to the pivot pin 78, and one end of the coil spring can be connected to the pivot pin and the other end to the frame arm. The coil spring will resiliently resist rotation of the pivot pin relative to the frame arm and will act as a shock absorber.

Figure 10:
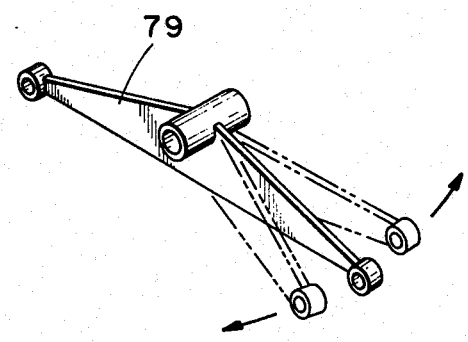
FIG. 10 is a perspective view of a modified form of center arm.

FIG. 10 illustrates a modified centering arm which can be used to accommodate the varying horizontal distance between the ends of the frame arms as they rotate relative to each other. The center arm 79 is formed of flexible and resilient metal to permit the ends thereof to flex in the direction of the arrows.

Figure 11:
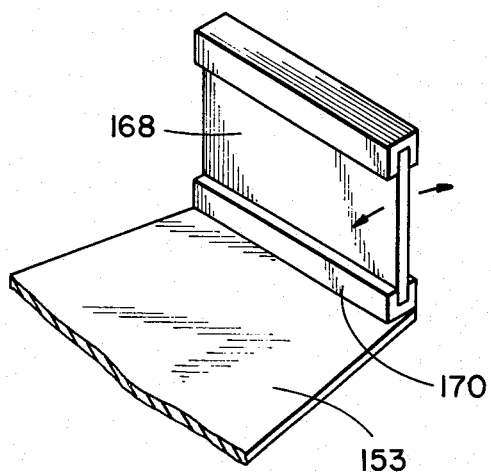
FIGS. 11–13 are modified forms of attaching means for mounting the vehicle body to the frame.
Figure 13:
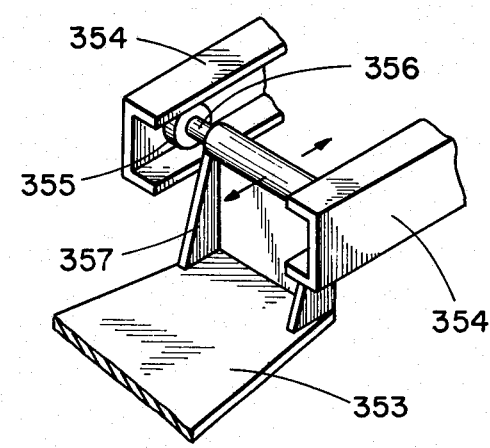
Figure 12:
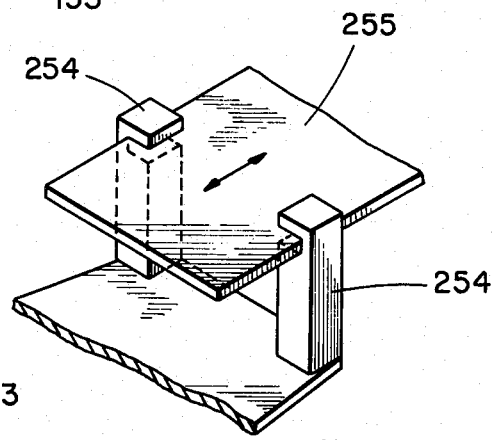

FIGS. 11–13 illustrate modified attaching means for securing the rear end of the vehicle body to the mounting arm 53 to accommodate changes in the horizontal distance between the ends of the mounting arms 52 and 53. In FIG. 11 a flexible plate 168 extends between bracket 170 mounted on the mounting arm 153 and a bracket 172 which is secured to the vehicle body. As the mounting arm 153 rotates about the center axle 29 relative to the other mounting arm, the flexible plate 168 can flex in the direction of the arrows to accommodate changes in the horizontal distance between the ends of the mounting arms without transmitting stress to the fixed attaching point on the vehicle body.

In FIG. 12, the mounting plate 253 carries a pair of supports 254 which slidably support a plate 255 which is secured to the vehicle body. In FIG. 13, the mounting plate 353 is mounted for longitudinal sliding movement relative to a pair of channels 354 which are secured to the vehicle body. A roller 355 rides within each channel and is rotatably supported by an axle 356 carried by a bracket 357 attached to the mounting plate 353.

Figure 14:
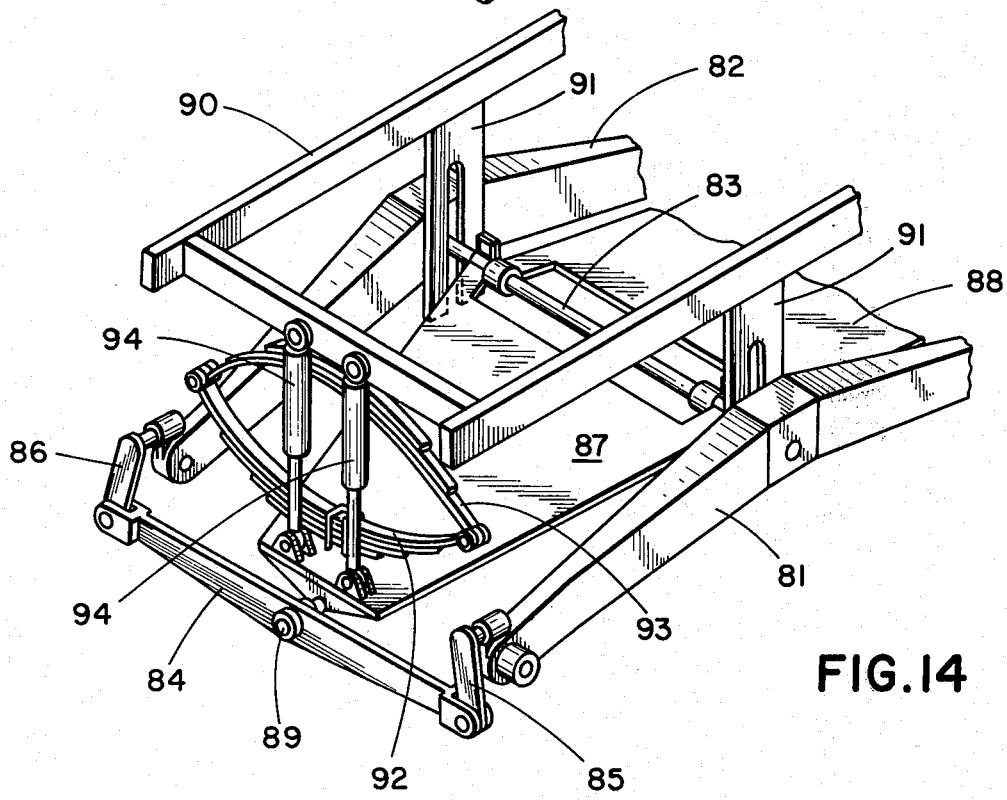
FIG. 14 is a fragmentary perspective view of modified frame equipped with shock absorbing means.

A modified spring suspension means is illustrated in FIG. 14. Frame arms 81 and 82 are rotatably secured to a center axle 83, and a rigid connecting or center arm 84 is pivotally secured to links 85 and 86. Each of the links is also pivotally secured to the front end of the frame arms in the manner hereinbefore described. A similar rigid connecting arm extends between the rear end of the frame arms. Rigid mounting plate 87 and 88 are each pivotally connected to the center axle, and the front end of the mounting plate 87 is rotatably connected to the center arm 84 by a pin 89.

The vehicle body includes a body frame 90 having a pair of downwardly extending arms 91. The arms 91 are slotted to receive the center axle 83 and to thereby fix the vehicle body longitudinally relative to the axle. An arcuate leaf spring 92 is secured to the front end of the mounting plate 87, and an arcuate leaf spring 93 is secured to the body frame 90. The ends of the leaf springs are secured together to permit the leaf springs to flatten, and a pair of shock absorbers 94 extend between the body frame and the mounting plate and are pivotally connected thereto.

A similar leaf spring and shock absorber suspension assembly can be used to secure the rear end of the mounting plate 88 to the rear of the body frame, and shocks which are encountered by the wheels are dampened by the leaf springs and the shock absorbers.

Although we have described the vehicle as being provided with only four wheels, one on each end of the frame arms, additional wheel arrangements can be used as shown, for example, in FIGS. 8–10 of our U.S. Pat. No. 3,525,534.

While in the foregoing specification, detailed descriptions of specific embodiments of the invention were set forth for the purpose of illustration, it is to be understood that many of the details herein given may be varied considerably by those skilled in the art without departing from the spirit and scope of the invention.

We claim:

1. A vehicle frame for supporting a vehicle body, said frame comprising a pair of elongated rigid spaced-apart frame arms, central axle means extending generally transversely between the frame arms at approximately the midpoints thereof to provide a forwardly extending portion and a rearwardly extending portion for each frame arm, each frame arm being rotatably secured to the central axle means for rotation about a main axis, a wheel carried by each frame arm adjacent each of the forward and rearward ends thereof, forward connecting arm means extending generally transversely between the forward portions of the frame arms and secured thereto, rearward connecting arm means extending generally transversely between the rearward portions of the frame arms and secured thereto, attaching means connected to each of the connecting arm means and adapted for attaching the frame to a vehicle body, each of the connecting arm means including link means for permitting the distance between the ends of the frame arms to vary as one frame arm rotates about the main axis relative to the other frame arm while maintaining each of the attaching means substantially centered transversely between the frame arms.

2. The structure of claim 1 in which each of the attaching means comprises a mounting arm extending between the central axle means to the associated connecting arm means, each of the mounting arms being independently rotatable relative to each other and to the frame arms about an axis extending generally parallel to the main axis.

3. A vehicle frame for supporting a vehicle body, said frame comprising a pair of elongated spaced-apart frame arms, central axle means extending generally transversely between the frame arms at approximately the midpoints thereof to provide a forwardly extending portion and a rearwardly extending portion for each frame arm, each frame arm being rotatably secured to the central axle means for rotation about a main axis, a wheel carried by each frame arm adjacent each of the forward and rearward ends thereof, forward connecting arm means extending generally transversely between the forward portions of the frame arms and secured thereto, rearward connecting arm means extending generally transversely between the rearward portions of the frame arms and secured thereto, attaching means connected to each of the connecting arm means and adapted for attaching the frame to a vehicle body, each of the connecting arm means including link means for permitting the distance between the ends of the frame arms to vary as one frame arm rotates about the main axis relative to the other frame arm while maintaining each of the attaching means substantially centered transversely between the frame arms, each of the connecting arm means including a center arm having a pair of ends, the link means of each connecting arm means comprising a pair of relatively rigid links, each link being pivotally secured to one end of the center arm and pivotally secured to the associated frame arm whereby the distance between the ends of the frame arms can be increased by pivoting movement of the links of each pair toward each other.

4. The structure of claim 3 in which each of the center arms comprises an upwardly bowed spring bar, the links secured to each spring bar being pivotable away from each other to permit the bow of the spring bar to decrease and the minimum distance between the ends of the spring bar to increase whereby the spring bars serve to cushion the vehicle body from shocks encountered by the wheels.

5. The structure of claim 4 in which each of the spring bars are leaf springs.

6. A vehicle frame for supporting a vehicle body, said frame comprising a pair of elongated spaced-apart frame arms, central axle means extending generally transversely between the frame arms at approximately the midpoints thereof to provide a forwardly extending portion and a rearwardly extending portion for each frame arm, each frame arm being rotatably secured to the central axle means for rotation about a main axis, a wheel carried by each frame arm adjacent each of the forward and rearward ends thereof, forward connecting arm means extending generally transversely between the forward portions of the frame arms and secured thereto, rearward connecting arm means extending generally transversely between the rearward portions of the frame arms and secured thereto, attaching means connected to each of the connecting arm means and adapted for attaching the frame to a vehicle body, each of the connecting arm means including link means for permitting the distance between the ends of the frame arms to vary as one frame arm rotates about the main axis relative to the other frame arm while maintaining each of the attaching means substantially centered transversely between the frame arms, each of the attaching means comprising a mounting arm extending between the central axle means to the associated connecting arm means, each of the mounting arms being independently rotatable relative to each other and to the frame arms about an axis extending generally parallel to the main axis, and securing means for securing each of the mounting arms to the associated connecting arms for permitting rotation between each mounting arm and the associated connecting arm means about an axis extending generally perpendicularly to the main axis and for permitting relative movement of the securing means relative to the associated connecting arm means in a direction generally parallel to the axis of rotation between the securing means and the associated connecting arm means.

7. A vehicle frame for supporting a vehicle body, said frame comprising a pair of elongated spaced-apart frame arms, central axle means extending generally transversely between the frame arms at approximately the midpoints thereof to provide a forwardly extending portion and a rearwardly extending portion for each frame arm, each frame arm being rotatably secured to the central axle means for rotation about a main axis, a wheel carried by each frame arm adjacent each of the forward and rearward ends thereof, forward connecting arm means extending generally transversely between the forward portions of the frame arms and secured thereto, rearward connecting arm means extending generally transversely between the rearward portions of the frame arms and secured thereto, attaching means connected to each of the connecting arm means and adapted for attaching the frame to a vehicle body, each of the connecting arm means including link means for permitting the distance between the ends of the frame arms to vary as one frame arm rotates about the main axis relative to the other frame arm while maintaining each of the attaching means substantially centered transversely between the frame arms, each of the attaching means comprising a mounting arm extending between the central axle means to the associated connecting arm means, each of the mounting arms being independently rotatable relative to each other and to the frame arms about an axis extending generally parallel to the main axis, a vehicle body, first mounting means pivotally connecting the vehicle body to one of the mounting arms adjacent the associated connecting arm means for permitting relative pivotal movement between the vehicle body and said one mounting arm about an axis extending generally parallel to the main axis, and second mounting means pivotally connecting the vehicle body to the other of the mounting arms adjacent to the associated connecting arm means for permitting relative pivotal movement between the vehicle body and said other mounting arm about an axis extending generally parallel to the main axis and for permitting relative movement between the vehicle body and said other mounting arm in a direction generally perpendicular to the main axis.

8. The structure of claim 7 in which each of the mounting means is connected to the vehicle body to substantially prevent rotation of the vehicle body about an axis extending perpendicularly to the main axis.

* * * * *